United States Patent
Nakato et al.

(10) Patent No.: US 8,202,664 B2
(45) Date of Patent: Jun. 19, 2012

(54) MEMBRANE ELECTRODE ASSEMBLY, FUEL CELL STACK AND FUEL CELL SYSTEM

(75) Inventors: Kunihiro Nakato, Gunma (JP); Atsuo Sonai, Kanagawa (JP)

(73) Assignees: Sanyo Electric Co., Ltd., Osaka (JP); Samsung SDI Co., Ltd., Gyeonggi-Do (KR); Samsung Electronics Co., Ltd., Gyeonggi-Do (KR)

( * ) Notice: Subject to any disclaimer, the term of this patent is extended or adjusted under 35 U.S.C. 154(b) by 1823 days.

(21) Appl. No.: 11/183,169

(22) Filed: Jul. 18, 2005

(65) Prior Publication Data

US 2006/0286422 A1 Dec. 21, 2006

(30) Foreign Application Priority Data

Jul. 21, 2004 (JP) ................... 2004-213072

(51) Int. Cl.
*H01M 8/10* (2006.01)

(52) U.S. Cl. ......... 429/492; 429/493; 429/529; 429/483

(58) Field of Classification Search ............ 429/30–33, 429/41, 44, 46, 483, 491–494, 529
See application file for complete search history.

(56) References Cited

U.S. PATENT DOCUMENTS

| | | | | |
|---|---|---|---|---|
| 5,525,436 A | * | 6/1996 | Savinell et al. | 429/30 |
| 6,197,147 B1 | * | 3/2001 | Bonsel et al. | 156/269 |
| 6,946,211 B1 | * | 9/2005 | Bjerrum et al. | 429/33 |
| 2006/0078774 A1 | * | 4/2006 | Uensal et al. | 429/33 |

FOREIGN PATENT DOCUMENTS

| | | | |
|---|---|---|---|
| JP | 11-503262 | | 3/1999 |
| JP | 2000-503158 A | | 3/2000 |
| JP | 2003-317742 | | 11/2003 |
| JP | 2003317742 A | * | 11/2003 |
| WO | WO96/13872 | | 5/1996 |
| WO | WO 97/23919 | | 7/1997 |
| WO | WO 01/18894 | * | 3/2001 |
| WO | WO 2004/034500 A3 | | 4/2004 |

OTHER PUBLICATIONS

Japanese Notification of Reason(s) for Refusal, w/ English translation thereof, issued in Patent Application No. JP 2004-213072 dated on Jul. 15, 2008.
Korean Office Action issued in corresponding Korean Patent Application No. 10-2005-0041651 dated Aug. 30, 2006.

* cited by examiner

*Primary Examiner* — Tracy Dove
(74) *Attorney, Agent, or Firm* — McDermott Will & Emery LLP

(57) ABSTRACT

A membrane electrode assembly (MEA) is structured such that an anode is joined, via a carbon layer, to one surface of a solid polymer electrolyte membrane containing PBI and phosphoric acid and a cathode is joined to the other surface. The carbon layer is constituted by carbon powder and a first binder. Carbon black, carbon nanotube and the like may be used as carbon powder. The thickness of the carbon layer is preferably greater than that of the solid polymer electrolyte membrane.

13 Claims, 5 Drawing Sheets

(1)

(2)

(3)

MEMBRANE ELECTRODE ASSEMBLY, FUEL CELL STACK AND FUEL CELL SYSTEM

BACKGROUND OF THE INVENTION

1. Field of the Invention

The present invention relates to fuel cells, and it particularly relates to a fuel cell which is operable under the unhumidified conditions.

2. Description of the Related Art

Solid polymer fuel cells in which a solid polymer membrane is used as the electrolyte are known as a type of fuel cells. The solid polymer fuel cells use a proton conductive polymer electrolyte membrane as the electrolyte and generally include an anode (fuel electrode), a cathode (oxidizing agent electrode) and a polymer electrolyte membrane disposed between the anode and the cathode. The anode of a solid polymer-fuel cell is provided with a catalyst layer that accelerates the oxidation of the fuel, and the cathode thereof is provided with a catalyst layer that accelerates the reduction of the oxidizing agent.

The fuel to be supplied to the anode of a solid polymer fuel cell is generally hydrogen, hydrogen-containing gas, mixed vapor of methanol and water, aqueous solution of methanol or the like. The oxidizing agent to be supplied to the cathode of a solid polymer fuel cell is generally oxygen, oxygen-containing gas or air.

The material generally used for the polymer electrolyte membrane is sulfonated highly-fluorinated polymer, which has the principal chain composed of fluorinated alkylene and the side chain composed of fluorinated vinyl ether having a sulfonic acid group at the end. This type of polymer electrolyte membrane, impregnated with the supply of an appropriate amount of water, displays sufficient ionic conductivity for generating power.

The conventional solid polymer fuel cells therefore required the moisture control of the polymer electrolyte membrane, which in turn led to the complexity or large size of the fuel cell systems.

In addressing such problems caused by the moisture control of the polymer electrolyte membrane, an unhumidified electrolyte membrane that ensures proton conductivity in unhumidified conditions has been developed as a substitution for the conventional polymer electrolyte membrane.

For example, Reference (1) in the following Related Art List discloses polybenzimidazole doped with phosphoric acid as a material for an unhumidified polymer electrolyte membrane.

Related Art List (1) Japanese Patent Application Laid-Open No. Heill-503262.

Problems with known unhumidified polymer electrolyte membranes, however, have included the outflow of a strong acid, such as phosphoric acid, with a long time of operation, which tends to drop the open-circuit voltage and increase the cell resistance, thus impairing the stable operation of the fuel cell.

SUMMARY OF THE INVENTION

The present invention has been made in view of the foregoing circumstances and an object thereof is to provide a system and method for stabilizing over a long time the open-circuit voltage and cell resistance of a fuel cell using an unhumidified polymer electrolyte membrane.

A membrane electrode assembly according to the present invention is an assembly including an electrolyte membrane, an anode provided on one face of the electrolyte membrane and a cathode provided on the other face of the electrolyte membrane, wherein the electrolyte membrane contains a basic polymer and a strong acid and there is provided a carbon layer containing carbon powder and a first binder between the electrolyte membrane and the anode and/or the cathode.

By using a membrane electrode assembly of the above structure, the carbon layer provides a function of holding the electrolyte membrane and a function of preventing the permeation of reaction gas, so that changes in the open-circuit voltage and cell resistance of a fuel cell using a polymer electrolyte membrane without humidification can be stabilized. It is to be noted here that the above-mentioned electrolyte membrane may further contain a second binder. And it is preferable that the above-mentioned basic polymer is in a form of powder. The volume average particle diameter of the above-mentioned powder is preferably 10 to 100 μm.

Preferably, the above-mentioned basic polymer is selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines and polyvinylimidazoles.

It is preferable that the strong acid is phosphoric acid or sulfuric acid.

It is preferable that the first binder and/or the second binder is fluorocarbon resin.

It is preferable that the electrode assembly contains the second binder whose weight is approximately 3% to 60% of the total weight of the electrolyte membrane.

A fuel cell stack according to the present invention comprises a plurality of cells stacked, each of the cell including: the above-described membrane electrode assembly; an anode-side plate which is provided with a fuel path disposed counter to the anode of the membrane electrode assembly; and a cathode-side plate which is provided with an oxidizing agent path disposed counter to the cathode of the membrane electrode assembly.

A fuel cell system according to the present invention includes: a reforming unit which generates hydrogen gas by reforming hydrocarbon fuel; and a fuel cell stack, as described above, which generates power by using the hydrogen gas supplied from the reforming unit and oxidizing agent.

A method, for manufacturing membrane electrode assemblies, according to the present invention includes: producing a mixture by wet-blending carbon power and binder; producing a carbon layer by rolling the mixture in a rolling machine into sheets; drying the carbon layer; and providing, with the sheets of dried carbon layer, the carbon layer between an electrolyte membrane containing basic polymer and strong acid and an anode and/or a cathode of the membrane electrode assembly. By implementing the above method, a membrane electrode assembly, containing the unhumidified polymer electrolyte membrane, with which the open-circuit voltage and cell resistance of a fuel cell can be stabilized can be manufactured. The above method may further include impregnating the carbon layer with strong acid in a vacuum and/or under heating. By impregnating the carbon layer with the strong acid, the polymer electrolyte membrane without humidification can replenished with strong acid, so that the life and durability of the polymer electrolyte membrane without humidification can be further extended and improved.

It is to be noted that any arbitrary combination of the above-described components or elements are all effective as the present embodiments and may be encompassed by the scope of claims.

Moreover, this summary of the invention does not necessarily describe all necessary features so that the invention may also be sub-combination of these described features.

DETAILED DESCRIPTION OF THE INVENTION

The invention will now be described based on preferred embodiments which do not intend to limit the scope of the present invention but exemplify the invention. All of the features and the combinations thereof described in the embodiments are not necessarily essential to the invention.

Figure 1:
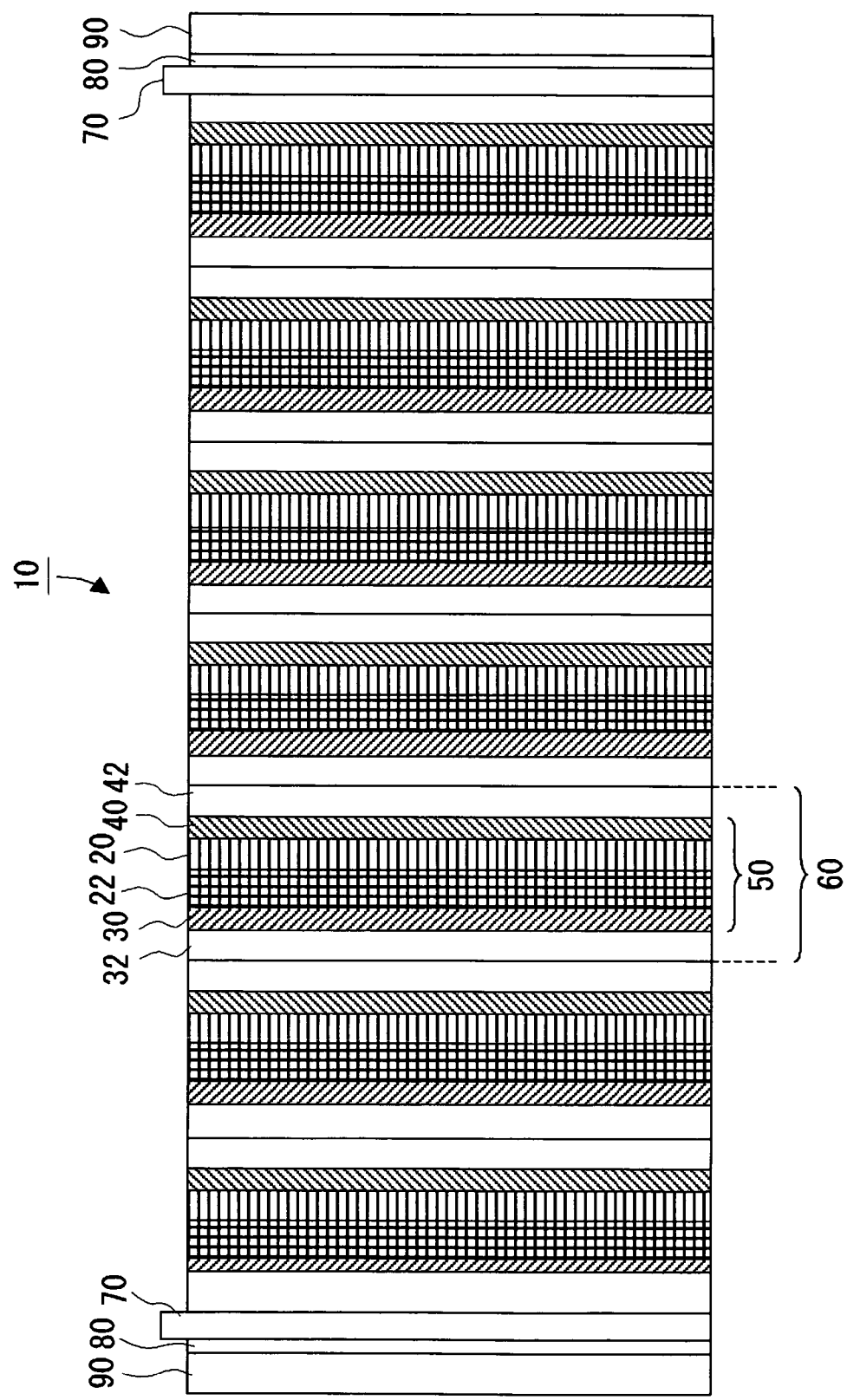
FIG. 1 shows a structure of a fuel cell stack according to an embodiment of the present invention.

FIG. 1 outlines a solid polymer fuel cell stack according to an embodiment of the present invention. The solid polymer fuel cell stack 10 includes a layered product comprised of a plurality of cells 60 stacked, each of which includes a membrane electrode assembly 50 (hereinafter referred to as MEA). This layered product is held together and fastened by end plates 90 on both sides thereof via a current collector 70 and an insulating plate 80 on each side. The MEA 50 according to the present embodiment is structured such that an anode 30 is joined to one surface of a solid polymer electrolyte membrane 20 via a carbon layer 22 and a cathode 40 is joined to the other surface thereof.

The carbon layer 22 is formed of carbon powder and a first binder. As carbon powder, carbon black, carbon nanotube and the like may be used. The first binder is preferably a fluorinated resin, the examples of which include polytetrafluoroethylene (PTFE), tetrafluoroethylene-hexafluoropropylene copolymer (FEP), perfluoroethylene (PFA) and polyvinylidene fluoride (PVDF). The carbon. layer 22 can be formed to have thickness greater than that of the solid polymer electrolyte membrane 20, or a thin carbon sheet whose pore diameter is smaller than that of the electrode (e.g., 0.01 to 0.5 μm) can be used. It is to be noted here that the carbon layer 22 may be provided between the MEA 50 and the cathode 40.

The anode 30 and the cathode 40, which are made mainly of carbon supporting platinum, provide reaction site with a diffusing path capable of diffusing gas. The cell 60 is structured such that an MEA 50 is sandwiched between an anode-side plate 32, which is provided with a fuel path counter to the anode 30 of the MEA 50, and a cathode-side plate 42, which is provided with an oxidizing agent path counter to the cathode 40 of the MEA 50. A cooling water conduit for passing cooling water as needed may be provided in the surface(s) of the anode-side plate 32 and/or the cathode-side plate 42 opposite to the MEA 50. In a cell structured as described above, hydrogen gas introduced into the anode 30 via the fuel path in the anode-side plate 32 is oxidized in the anode 30 to become protons (H+), and the protons then migrate through the solid polymer electrolyte membrane 20 to reach the cathode 40, in which they are reduced to water through their electrochemical reaction with oxygen in the air introduced therein via the oxidizing agent conduit in the cathode-side plate 42. As a result of this electrochemical reaction, a direct-current power is generated between the anode 30 and the cathode 40.

The solid polymer electrolyte membrane 20 according to the present embodiment contains a basic polymer and a strong acid and preferably further contains a second binder.

The basic polymer is preferably to be selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines and polyvinylimidazoles. Of these, the most preferably used is the group of polybenzimidazoles. The polybenzimidazole group is expressed by the chemical formula (1) in FIG. 6.

Figure 6:
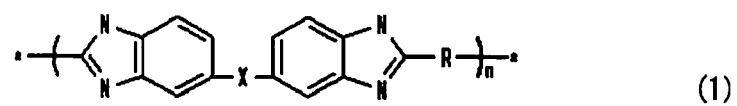
FIG. 6 shows chemical formulae (1), (2) and (3)
Figure 6:
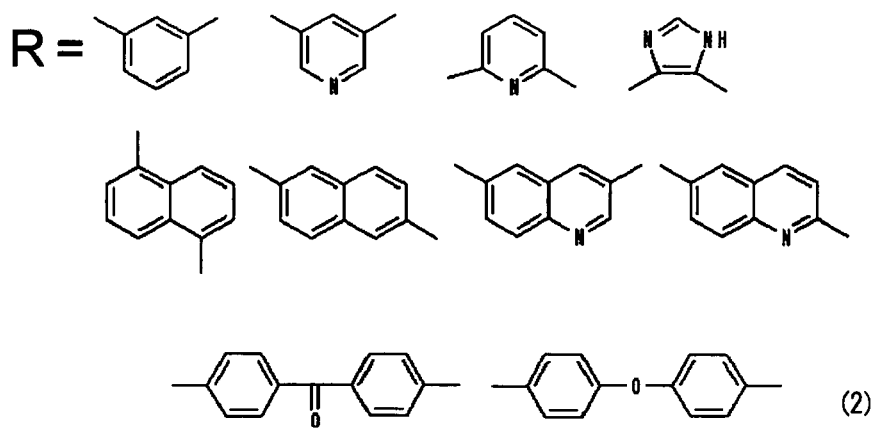
Figure 6:
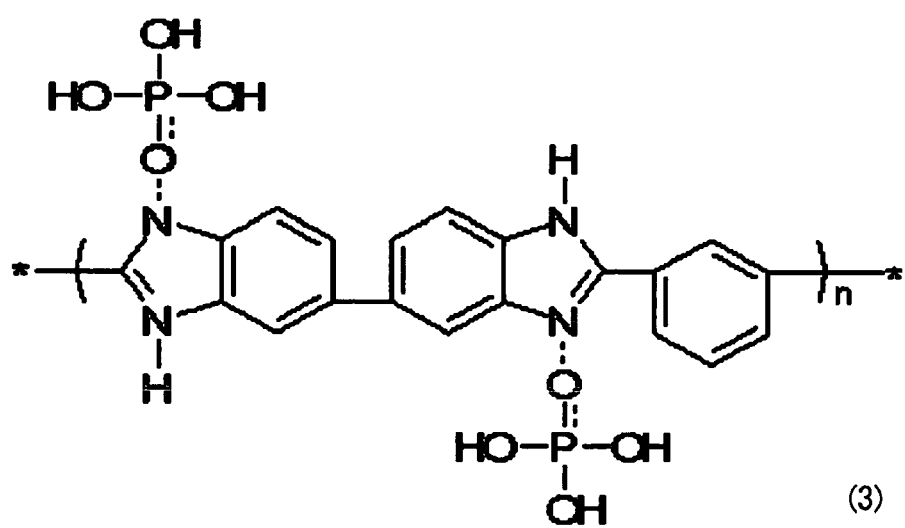

In the general formula (1) shown in FIG. 6, X is selected from —O—, —$SO_2$—, —$C(CH_3)_2$—, —C ($CF_3$)$_2$—, —OPhO—, or a direct bond. R is to include any of substituents (2) shown in FIG. 6.

From the viewpoint of polymer characteristics, such as mechanical strength or viscosity, the weight-average molecular weight of the basic polymer is preferably in the range of 1,000 to 1,000,000 or more preferably in the range of 200,000 to 500,000. The weight-average molecular weight of less than 1,000 may lead to an insufficient mechanical strength of the electrolyte obtained, and the weight-average molecular weight of more than 1,000,000 may cause a drop in the solubility with the solvent, thus making the forming of the solid polymer electrolyte membrane 20 difficult. The weight-average molecular weight of the basic polymer can be measured by any of known methods including gel permeation chromatography (GPC).

The basic polymer is preferably such as to form a composite with a strong acid, and this composite body or the complex is preferably in the form of powder. The volume average particle diameter of the basic polymer-acid complex powder is preferably 10 to 100 μm. Whereas the particle size of larger than 100 μm impairs durability and formability, that of smaller than 10 μm may increase the manufacturing cost.

The strong acid to be selected is an inorganic acid, such as phosphoric acid or sulfuric acid. In the case where phosphoric acid is used as the strong acid, it is preferable that the concentration thereof is approximately 85 to 122 ($H_3PO_4$). If the concentration of phosphoric acid is lower than 85 ($H_3PO_4$), insufficient ionic conductivity is caused, whereas if the concentration thereof is higher than 122($H_3PO_4$), the liquid viscosity is raised, which in turn tends to produce solid phase, thus making the manufacturing difficult.

The weight of the strong acid is preferably 5% to 99.9% of the total weight of the basic polymer and the strong acid. The weight of the strong acid of less than 5% causes insufficient ionic conductivity, whereas that of equal to or greater than 99.9% promotes gelatinization, thus impairing the function of a solid polymer electrolyte membrane.

It is to be noted that if the carbon layer 22 is also impregnated with the same strong acid as is used in the impregnation of the basic polymer, the strong acid can be supplied into the solid polymer electrolyte membrane from the carbon layer 22, so that the ionic conductivity of the solid polymer electrolyte membrane can be maintained over a long time.

Figure 2:
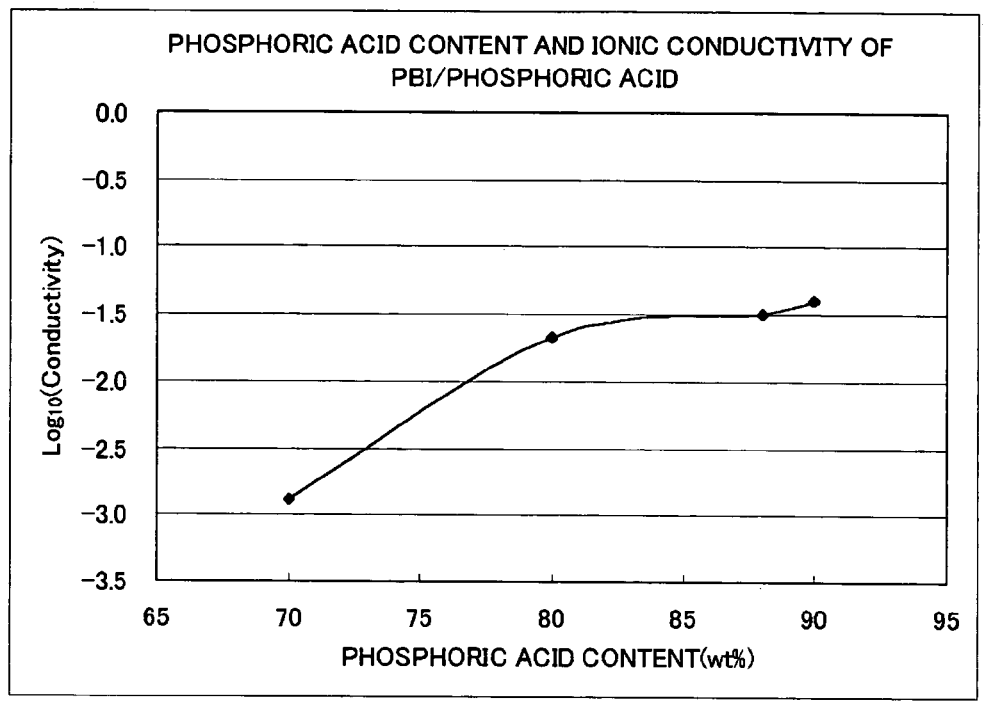
FIG. 2 illustrates a relationship between phosphoric acid content and ionic conductivity.

FIG. 2 illustrates a relationship between the phosphoric acid content and ionic conductivity of a polymer electrolyte membrane (thickness: 200 μm) which is PBI (volume average particle diameter: 50 μm) and phosphoric acid solidified by polytetrafluoroethylene. As is evident from FIG. 2, the ionic conductivity is held at a high level in the region where the phosphoric acid content is higher than 80 wt%.

Part of the strong acid is chemically bonded to the basic polymer, while the rest thereof is existent into the solid polymer electrolyte membrane. For example, in a solid polymer electrolyte membrane of a polybenzimidazole (hereinafter referred to as PBI) doped with phosphoric acid, the phosphoric acid is chemically bonded with the polybenzimidazole to form a PBI/phosphoric acid complex as expressed by the general formula (3) in FIG. 6.

There is the excess phosphoric acid around the PBI/phosphoric acid complex. The PBI/phosphoric acid complex, together with the excess phosphoric acid, makes proton conduction possible.

A solid polymer electrolyte membrane according to an embodiment displays greater bendability and flexibility than a solid polymer electrolyte membrane of a basic polymer alone because the powdery basic polymer thereof and the phosphoric acid impregnated into the basic polymer are solidified by a second binder. The second binder is preferably a fluorocarbon resin, the examples of which include polytetrafluoroethylene (PTFE), tetrafluoroethylene-hexafluoropropyrene copolymer (FEP), perfluoroethylene (PFA) and polyvinylidene fluoride (PVDF). The weight of the second binder is preferably 3% to 60% of the total weight of the electrolyte for use in a fuel cell. If the weight of the binder is less than 3% of the total weight of the electrolyte for a fuel cell, the binding performance will drop, thus rendering the forming of a solid polymer electrolyte membrane difficult. On the other hand, if the weight of the second binder exceeds 60% of the total weight of the electrolyte for a fuel cell, the resistance will increase and the ionic conductivity will drop, thus resulting in the insufficient performance of the solid polymer electrolyte membrane.

The solid polymer electrolyte membrane as described above exhibits both chemical and thermal stability at high temperatures of 100° C. and above and has sufficient ionic conductivity for generating power in unhumidified conditions. As a result, moisture control of the solid polymer electrolyte membrane is not required, and problems related to such moisture control are eliminated.

Moreover, the above-mentioned solid polymer electrolyte membrane, which is flexible, is less susceptible to damage such as cracking and is therefore highly durable. Moreover, the solid polymer electrolyte membrane according to the present invention is easy to form, so that time and efforts required to process it into a desired form or in a thinner membrane will be significantly reduced.

According to the present invention, provision of a carbon layer which can supply a strong acid to either of the surfaces of the above-mentioned solid polymer electrolyte membrane and present a function of preventing gas permeation suppresses the outflow of the strong acid from the solid polymer electrolyte membrane, ensures stable changes in the open-circuit voltage and cell resistance, and maintains ionic conductivity over a long time. The carbon layer also prevents gas leak, thus stabilizing the cell performance.

Figure 3:
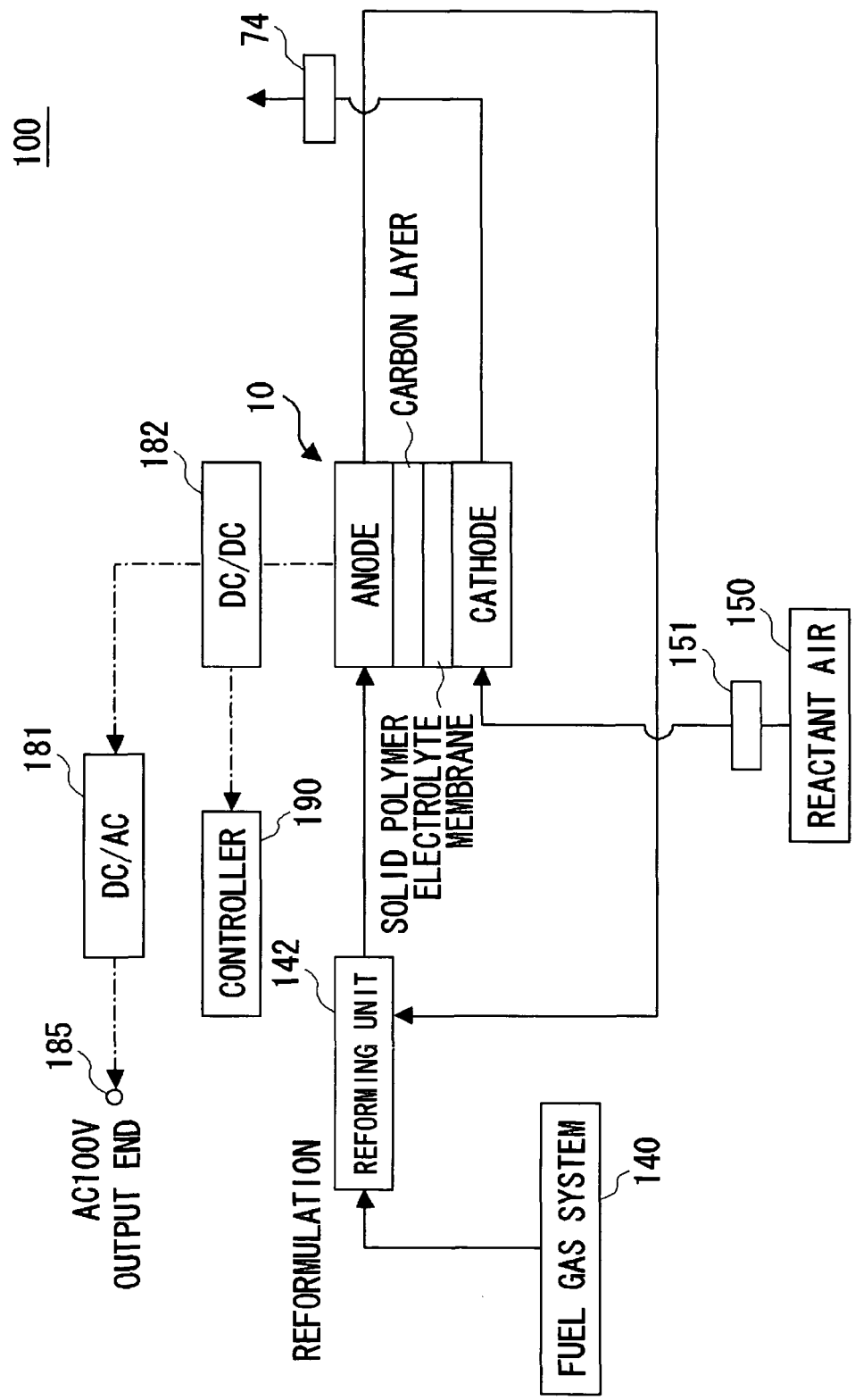
FIG. 3 illustrates a structure of a fuel cell system according to an embodiment of the present invention.

FIG. 3 illustrates a general structure of a solid fuel cell system using the above-described polymer fuel cell stack. The solid polymer fuel cell system 100 generates direct-current power by supplying hydrogen gas, which is obtained by reforming a hydrocarbon fuel gas, and reactant air to a solid polymer fuel cell stack 10 shown in FIG. 1, where an electrochemical reaction takes place between hydrogen and oxygen contained in the reactant air.

The hydrogen gas is obtained by reforming the hydrocarbon fuel gas supplied from a fuel gas system 140 through steam reforming in a reforming unit 142. The hydrogen gas obtained in the reforming unit 142 is supplied to the fuel path in the anode-side plate 32 of each cell 60 in the solid polymer fuel cell stack 10.

On the other hand, reactant air 150 is sent in by a blower 151 and then an appropriate amount thereof is supplied to the oxidizing agent conduit in the cathode-side plate 42 of each cell 60 in the solid polymer fuel cell stack 10.

Unused hydrogen gas, which has not been used in the reaction in the solid polymer fuel cell stack 10, is supplied to the reforming unit 142, where it is utilized as fuel to provide heat. On the other hand, unutilized reactant air, which has not been used in the reaction in the solid polymer fuel cell stack 10, is sent to an exhaust duct 74.

Direct-current power generated in the solid polymer fuel cell stack 10 is converted into a direct-current power of a predetermined voltage by a DC/DC converter 182 and then converted into an alternating-current power (100 V for instance) by a DC/AC inverter 181. The AC power, after the conversion in the DC/AC inverter 181, is outputted to an output end 185. The DC power of a predetermined voltage, after the conversion in the above-mentioned DC/DC converter 182, is also used as a power source for a controller 190 and the like.

The controller 190 performs various control of the solid polymer fuel cell system 100. That is, the controller 190 controls the solid polymer fuel cell stack 10, the blower 151, the DC/AC inverter 181, the DC/DC converter 182 and the like through sending and receiving electrical signals therebetween.

Conventional solid polymer fuel cell systems have been in need of some means to humidify the fuel and/or the oxidizing agent so as to keep the electrolyte membrane in humidified conditions. The solid polymer fuel cell system 100 according to the present invention, however, provides ionic conduction by the solid polymer electrolyte membrane 20 in unhumidified conditions and therefore does not require any means to humidify the fuel and/or the oxidizing agent, thus achieving simplified system structuring reduced volume and reduced cost.

Reforming units used in conventional solid polymer fuel cell systems are generally comprised of a desulfurizer, which removes sulfur compounds from fuel gas, a steam reforming unit, which produces hydrogen through a reaction between fuel gas and water, a CO transformer, which changes CO (carbon monoxide) into $CO_2$ (carbon dioxide) and $H_2$ (hydrogen) in a reaction between CO and water, and a CO remover, which removes CO having remained in the CO reforming unit through selective oxidization. With a solid polymer fuel cell system 100 according to the present invention, however, it shows the insensitivity on poisoning by CO, so that the reforming unit has no need for a CO remover. Hence, it is possible to make the reforming unit smaller and reduce cost.

Fabrication of Solid Polymer Electrolyte Membrane 10 wt% of PBI solution was prepared by adding 10 grams of PBI (weight-average molecular weight: about 70,000) to 90 grams of N, N'-dimethylacetoamide. At room temperature, 100 grams of 10 wt% PBI solution was added gradually with stirring to 90 grams of 115% phosphoric acid in a 200-ml beaker. The mixture thus obtained was dried at 170° C. for 2 to 3 days to remove remaining N, N'-dimethylacetoamide. Then a solid material containing PBI and phosphoric acid was pulverized by a jet mill. The volume average particle diameter of the resultant powder, measured by a particle diameter distribution measuring instrument, was 50 μm. It is to be noted that a powder of a desired volume average particle diameter can be obtained by breaking up the above-mentioned powder with a blowing-type classifier after the solid material containing PBI and phosphoric acid has been pulverized by a jet mill.

Next, 15 grams of the powder containing PBI and phosphoric acid obtained in the above-described process and 3 grams of PTFE were wet-blended at room temperature. The resultant mixture was fabricated by a rolling machine into two sheets 320 µm and 260 µm thick, respectively. These sheets were dried at 120° C. for 2 to 3 hours to remove remaining solvent, thus producing solid polymer electrolyte membranes.

Fabrication of Carbon Layer

Carbon layers representative of the present invention were fabricated as follows. 3 grams of carbon powder and 1.8 grams of PTFE were wet-blended in a beaker at room temperature. The resultant mixture was fabricated by a rolling machine into two carbon layer sheets 310 µm and 370 µm thick, respectively. These carbon layer sheets were dried at 120° C. for 2 to 3 hours and then at 200° C. for about one hour to remove remaining solvent. After this, they were impregnated with phosphoric acid in a vacuum (0.5 Torr) at 180° C. so that the fine pores, constituting over 95% (inclusive) of the volume of the carbon layer, may be filled with phosphoric acid.

First Embodiment

A membrane electrode assembly was produced by joining a cathode to one surface of the above-mentioned 260 µm thick polymer electrolyte membrane and an anode to the other surface thereof via the above-mentioned 370 µm thick carbon layer.

COMPARATIVE EXAMPLE 1

A membrane electrode assembly was produced by joining a cathode to one surface of the above-mentioned 630 µm thick polymer electrolyte membrane and an anode to the other surface thereof. To enable a comparison in membrane performance, the total thickness of the polymer electrolyte membrane of comparative example 1 was set at the same thickness as in the first embodiment.

Evaluation

The membrane electrode assemblies in the first embodiment and the comparative example 1 were each incorporated into a solid polymer fuel cell stack as shown in FIG. 1, and their respective open-circuit voltages (OCV) and cell resistances were measured.

Figure 4:
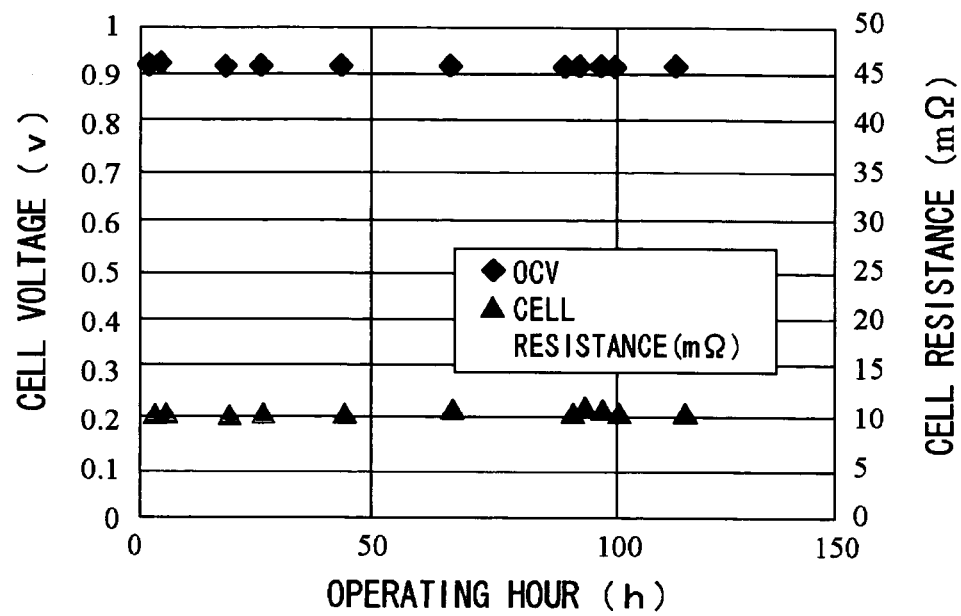
FIG. 4 shows measurement results of open-circuit voltage (OCV) and cell resistance when a membrane electrode assembly in a first embodiment is used.
Figure 5:
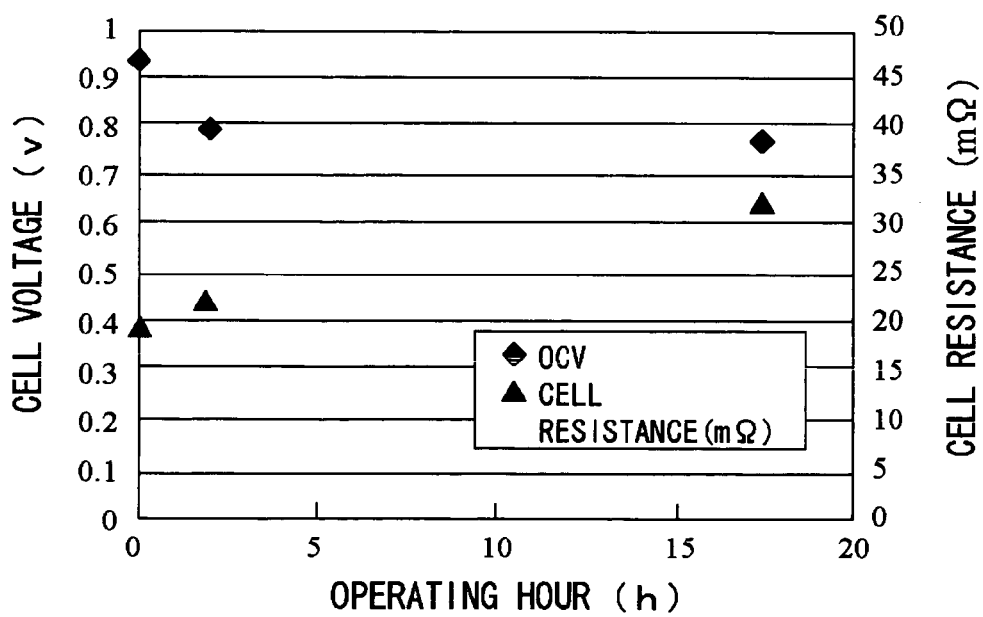
FIG. 5 shows measurement results of open-circuit voltage (OCV) and cell resistance when a membrane electrode assembly in comparative example 1 is used.

FIG. 4 illustrates the measurement results of open-circuit voltage (OCV) and cell resistance when the membrane electrode assembly in the first embodiment is used. FIG. 5 illustrates the measurement results of open-circuit voltage (OCV) and cell resistance when the membrane electrode assembly in comparative example 1 is used.

As is clear in FIG. 5, the OCV of the membrane electrode assembly in comparative example 1 lowered with time and the cell resistance thereof increased with time. In contrast to this, as is clear in FIG. 4, both the OCV and cell resistance of the membrane electrode assembly in the first embodiment remained stable.

It is assumed therefore that the carbon layer has produced the following effects:

(1) Since the carbon layer has a function of a core body, the thickness of the solid polymer electrolyte diminishes by the thickness of of the carbon layer. Since the carbon powder in the carbon layer has electron conductivity, increased thickness of the carbon layer has little effect on the cell resistance. As a result, the solid polymer electrolyte membrane is maintained stable without a rise in the cell resistance.

(2) The carbon layer allows the use of a larger bubble pressure, so that the cross leak of reaction gas is suppressed and the OCV is kept constant.

The present invention has been described based on the embodiments which are only exemplary and is thus not limited thereto. It is understood that there exist other various kinds of modifications such as design modifications based on the knowledge of those skilled in the art and there also exist any other various modifications to the combination of each component and process described above, and that such modifications as well as embodiments with the modifications implemented thereto are encompassed by the scope of the present invention which is defined by the appended claims.

What is claimed is:

1. A membrane electrode assembly including an electrolyte membrane, an anode provided on one face of the electrolyte membrane and a cathode provided on the other face of the electrolyte membrane, wherein
    the electrolyte membrane contains a basic polymer having an average molecular weight of 1,000 to 1,000,000 and first strong acid, and the basic polymer and the first strong acid form a complex in the form of powder having a volume average particle diameter of 10 to 100µm, and
    a carbon layer containing carbon powder, a first binder, and second strong acid of the same type as the first strong acid contained in the electrolyte membrane, is between the electrolyte membrane and the anode or the electrolyte membrane and the cathode, the first binder comprising a fluorinated resin selected from the group consisting of polytetrafluoroethylene (PTFE), tetrafluoroethylene-hexafluoropropylene copolymer (FEP), perfluoroethylene (PFA) and polyvinylidene fluoride (PVDF).

2. A membrane electrode assembly according to claim 1, wherein the electrolyte membrane further includes a second binder selected from the group consisting of polytetrafluoroethylene (PTFE), tetrafluoroethylene-hexafluoropropylene copolymer (FEP), perfluoroethylene (PFA) and polyvinylidene fluoride (PVDF).

3. A membrane electrode assembly according to claim 1, wherein the basic polymer is selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines and polyvinylimidazoles.

4. A membrane electrode assembly according to claim 2, wherein the basic polymer is selected from the group consisting of polybenzimidazoles, poly(pyridines), poly(pyrimidines), polyimidazoles, polybenzothiazoles, polybenzoxazoles, polyoxadiazoles, polyquinolines, polyquinoxalines, polythiadiazoles, poly(tetrazapyrenes), polyoxazoles, polythiazoles, polyvinylpyridines and polyvinylimidazoles.

5. A membrane electrode assembly according to claim 1, wherein the first strong acid and the second strong acid are phosphoric acid or sulfuric acid.

6. A membrane electrode assembly according to claim 2, wherein the first strong acid and the second strong acid are phosphoric acid or sulfuric acid.

7. A membrane electrode assembly according to claim 2, wherein the weight of the second binder is approximately 3% to 60% of the total weight of the electrolyte membrane.

8. A fuel cell stack, comprising a plurality of cells stacked, each of the cells including:

a membrane electrode assembly including: an electrolyte membrane; an anode provided on one face of the electrolyte membrane; and a cathode provided on the other face of the electrolyte membrane, wherein the electrolyte membrane contains a basic polymer having an average molecular weight of 1,000 to 1,000,000 and first strong acid, and the basic polymer and the first strong acid form a complex in the form of powder having a volume average particle diameter of 10 to 100μm;

a carbon layer containing carbon powder, a first binder, and second strong acid of the same type as the first strong acid contained in the electrolyte membrane, the carbon layer being between at least one of the electrolyte membrane and the anode or the electrolyte membrane and the cathode, the first binder comprising a fluorinated resin selected from the group consisting of polytetrafluoroethylene (PTFE), tetrafluoroethylene -hexafluoropropylene copolymer (FEP), perfluoroethylene (PFA) and polyvinylidene fluoride (PVDF);

an anode-side plate which is provided with a fuel path disposed counter to the anode of said membrane electrode assembly; and a cathode-side plate which is provided with an oxidizing agent path disposed counter to the cathode of said membrane electrode assembly.

9. A fuel cell stack, comprising a plurality of cells stacked, each of the cells including:

a membrane electrode assembly including: an electrolyte membrane which contains a second binder; an anode provided on one face of the electrolyte membrane; and a cathode provided on the other face of the electrolyte membrane, wherein the electrolyte membrane contains a basic polymer having an average molecular weight of 1,000 to 1,000,000 and first strong acid, and the basic polymer and the first strong acid form a complex in the form of powder having a volume average particle diameter of 10 to 100μm;

a carbon layer containing carbon powder, a first binder, and second strong acid of the same type as the first strong acid contained in the electrolyte membrane, the carbon layer being between at least one of the electrolyte membrane and the anode or the electrolyte membrane and the cathode, the first binder comprising a fluorinated resin selected from the group consisting of polytetrafluoroethylene (PTFE), tetrafluoroethylene-hexafluoropropylene copolymer (FEP), perfluoroethylene (PFA) and polyvinylidene fluoride (PVDF);

an anode-side plate which is provided with a fuel path disposed counter to the anode of said membrane electrode assembly; and a cathode-side plate which is provided with an oxidizing agent path disposed counter to the cathode of said membrane electrode assembly.

10. A fuel cell system, comprising:

a reforming unit which generates hydrogen gas by reforming hydrocarbon fuel; and a fuel cell stack which generates power by using the hydrogen gas supplied from said reforming unit and oxidizing agent, the fuel cell stack including a plurality of cells stacked, each of the cells including:

a membrane electrode assembly including: an electrolyte membrane; an anode provided on one face of the electrolyte membrane; and a cathode provided on the other face of the electrolyte membrane, wherein the electrolyte membrane contains a basic polymer having an average molecular weight of 1,000 to 1,000,000 and first strong acid, and the basic polymer and the first strong acid form a complex in the form of powder having a volume average particle diameter of 10 to 100μm;

a carbon layer containing carbon powder and a first binder, and second strong acid of the same type as the first strong acid contained in the electrolyte membrane, the carbon layer being between at least one of the electrolyte membrane and the anode or the electrolyte membrane and the cathode, the first binder comprising a fluorinated resin selected from the group consisting of polytetrafluoroethylene (PTFE), tetrafluoroethylene -hexafluoropropylene copolymer (FEP), perfluoroethylene (PFA) and polyvinylidene fluoride (PVDF);

an anode-side plate which is provided with a fuel path disposed counter to the anode of said membrane electrode assembly; and a cathode-side plate which is provided with an oxidizing agent path disposed counter to the cathode of said membrane electrode assembly.

11. A fuel cell system, comprising:

a reforming unit which generates hydrogen gas by reforming hydrocarbon fuel; and a fuel cell stack which generates power by using the hydrogen gas supplied from said reforming unit and oxidizing agent, the fuel cell stack including a plurality of cells stacked, each of the cells including:

a membrane electrode assembly including: an electrolyte membrane which contains a second binder; an anode provided on one face of the electrolyte membrane; and a cathode provided on the other face of the electrolyte membrane, wherein the electrolyte membrane contains a basic polymer having an average molecular weight of 1,000 to 1,000,000 and first strong acid, and the basic polymer and the first strong acid form a complex in the form of powder having a volume average particle diameter of 10 to 100μm;

a carbon layer containing carbon powder, a first binder, and second strong acid of the same type as the first strong acid contained in the electrolyte membrane, the carbon layer being between at least one of the electrolyte membrane and the anode or the electrolyte membrane and the cathode, the first binder comprising a fluorinated resin selected from the group consisting of polytetrafluoroethylene (PTFE), tetrafluoroethylene -hexafluoropropylene copolymer (FEP), perfluoroethylene (PFA) and polyvinylidene fluoride (PVDF);

an anode-side plate which is provided with a fuel path disposed counter to the anode of said membrane electrode assembly; and a cathode-side plate which is provided with an oxidizing agent path disposed counter to the cathode of said membrane electrode assembly.

12. The electrolyte membrane according to claim 1, wherein the thickness of the carbon layer is greater than the thickness of the electrolyte membrane.

13. The electrolyte membrane according to claim 1, wherein the carbon layer has a pore diameter smaller than that of the anode or cathode adjacent to the carbon layer.

* * * * *